Nov. 26, 1968 G. I. REEVES ET AL 3,413,491
PEAK HOLDER EMPLOYING FIELD-EFFECT TRANSISTOR
Filed Sept. 21, 1964

INVENTORS
GEORGE I. REEVES
BY DAVID M. REED
T. E. Kristofferson
ATTORNEY

United States Patent Office 3,413,491

Patented Nov. 26, 1968

3,413,491

PEAK HOLDER EMPLOYING FIELD-EFFECT TRANSISTOR

George I. Reeves, Fullerton, and David M. Reed, La Habra, Calif., assignors to Beckman Instruments, Inc., a corporation of California Filed Sept. 21, 1964, Ser. No. 397,903
5 Claims. (Cl. 307—235)

ABSTRACT OF THE DISCLOSURE

The specification describes a peak holder incorporating a high-gain preamplifier connected in series with a diode arranged to pass the signal to be detected and held, and a post-amplifier having a high input impedance. A capacitive storage device is connected from the point between the diode and the post-amplifier to a reference point, which may be an output terminal of the post-amplifier. A feedback resistor is connected from the output of the post-amplifier to the input of the preamplifier.

This invention relates to a peak holder and more particularly to an improved peak holder such as may be used in a gas chromatograph wherein the effects of the voltage drop across the diode are compensated for.

A peak holder senses a maximum signal from a varying signal over some specified time period. The simplest form of peak holder employes a diode-capacitor circuit which suffers from inaccuracy because of the voltage drop which occurs across the diode. Such a circuit will experience signal blanking and will not operate at signal amplitudes less than the level of the drop across the diode. The prior art has biased the diode which results in some improvement. However, even then operation at levels of less than 1/10 of a volt are not feasible. Accordingly, it is an object of this invention to provide a peak holding circuit in which the effect of the back-bias of the diode is substantially eliminated.

Another object of this invention is to employ such a circuit including a high bleed-off impedance in the circuit subsequent to the storage device to enable retention of the peak for long time periods.

A further object of this invention is to provide such an improved circuit in which the diode will be rapidly back-biased due to open loop gain such that a relatively minute swing in the signal in the direction away from the peak will back-bias the diode.

In carrying out the invention in one form thereof a high gain preamplifier is connected in series with a diode arranged to pass the signal to be detected and held, and a post amplifier having a high input impedance. A storage device is connected from the point between the diode and the post amplifier to a point of reference potential. A feedback resistor is connected from the output of the post amplifier to the input of the preamplifier. When the input signal goes in the direction which the diode will normally pass, the peak value is followed and stored on the capacitor. When the input signal reverses itself, the high gain of the preamplifier will rapidly back-bias the diode whereby after passing a peak, the diode is quickly back-biased by the high gain of the preamplifier through the feedback resistor in order to hold the peak value on the storage device without degraduation due to the reverse-biasing of the diode.

The novel features which are believed to be characteristic of the invention are set forth with particularity in the appended claims. The invention itself, however, together with further objects and advantages thereof, can best be understood by reference to the following description taken in connection with the accompanying drawing in which:

Figure 1:
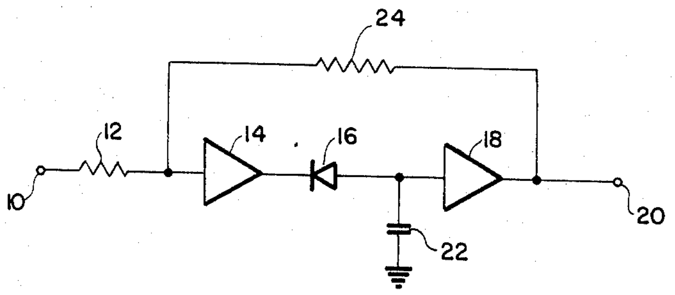
FIG. 1 is a block diagram of the invention.

Referring now to the drawing, FIG. 1 illustrates a circuit which was meant to store the peak of a nonrecurrent pulse and remember this for at least 45 seconds with less than a one percent loss. An input signal $e_{in}$ is applied to a terminal 10 and through a resistor 12 to the input of a preamplifier 14. The output of preamplifier 14 is connected through a diode 16, to the input of a post amplifier 18, whose output in turn is connected to output terminal 20. A storage capacitor 22 is connected from a point between diode 16 and post amplifier 18 to a point of reference potential. A feedback resistor 24 is connected from output terminal 20 to the input of preamplifier 14.

Referring to resistor 12 as $R_1$ and resistor 24 as $R_2$, the gain of amplifier 14 as $-K_1$, the gain of amplifier 18 as $K_2$ and the output voltage as $e_o$, the gain of the circuit $R_2/R_1$ is determined by the values of $R_1$ and $R_2$. The first amplifier 14 can have any gain desired and amplifier 18 has a gain of substantially one. In one application, $K_1$ was made equal to approximately $-350$ and $K_2$ was noninverting with a gain of slightly less than unity.

In most circuit applications where diodes are used large signals must be used to minimize the 2/10 to 1 volt drop in the diode. For high temperature applications, silicon is desired. This material has a minimum of 6/10 of a volt drop. If the magnitude of the signal is 10 volts then 6 percent has been lost. If the desired signal is 1 volt then 60 percent of the desired signal is lost, and it is impossible to see signals of a magnitude of less than 6/10 of a volt since they are entirely blanked.

In the circuit of FIG. 1, the drop of the diode 16 has been reduced by the open loop gain of the two amplifiers 14 and 18 or by $K_1$, $K_2$. The operation of the circuit of FIG. 1 is as follows: When an input signal $e_{in}$ varying in the direction which will be passed by diode 16 is applied to terminal 10 it is passed by amplifier 14 and diode 16 and charge is stored on capacitor 22. When the direction of the input signal $e_{in}$ reverses itself diode 16 is rapidly back-biased by the amount of the voltage change multiplied by the open loop gain $K_1$. This holds the level of the charge on capacitor 22. The high input impedance of post amplifier 18 keeps capacitor 22 from discharging through it. The peak value may be read at the output of post amplifier 18.

Figure 2:
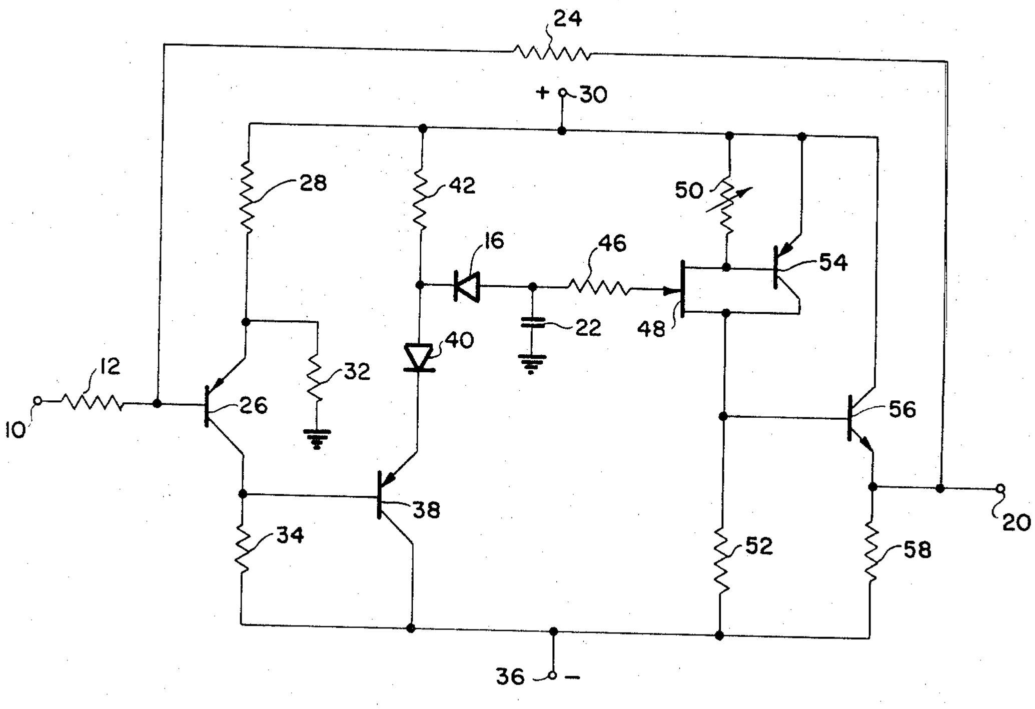
FIG. 2 is a schematic diagram illustrating a specific embodiment of the invention in more detail.

Referring to FIG. 2, where elements which correspond to those of FIG. 1 have been labeled using the identical numerals, the input voltage $e_{in}$ is applied to terminal 10 through a resistor 12 which may be 10,000 ohms, to the base of a transistor 26 which may be a 2N1132. The emitter of transistor 26 is connected through a resistor 28, which may be 5600 ohms, to a terminal 30, which is adapted to be connected to a source of positive potential, for instance, +18 volts. The emitter of transistor 26 is also connected through a resistor 32, which may be 200 ohms, to a point of reference potential, in this instance ground. This resistor 32 makes transistor 26 operate as a high gain amplifier. The collector of transistor 26 is connected through a resistor 34, which may be 68,000 ohms, to a terminal 36. Terminal 36 may be connected to a source of negative potential, for example −18 volts.

Transistor 26 acts as a high gain amplifier and its collector is connected to the base of a transistor 38, which may be a second 2N1132. The collector of transistor 38 is connected to the terminal 36 and its emitter is connected through a diode 40 in series with a resistor 42, which may be 10,000 ohms, to terminal 30. The polarity of diode 40 is as indicated in the drawing. Diode 40 may be a Zener diode and is used to keep transistor 26 from operating in a saturated mode. In this manner zero voltage at terminal 10 is also zero voltage on capacitor 22. The transistor 38 operates as a cathode follower, having its output connected from a point between diode 40 and resistor 42 through a second diode 16, poled as illustrated, and a series connected input impedance 46, which may be 10 megohms, to the gate electrode of a field effect transistor 48, which may be a TA2330.

A storage capacitor 22 is connected from a point between diode 16 and resistor 46 to ground. The source electrode of field effect transistor 48 is connected through a resistor 50 to terminal 30. Resistor 50 may be a variable resistor of about 2000 ohms which may be adjusted so that zero volts on the gate electrode of transistor 48 gives zero volts out at terminal 20. The drain electrode of transistor 48 is connected through a resistor 52, which may be 10,000 ohms, to terminal 36. The source electrode of transistor 48 is also connected to the base of transistor 54, which may be another 2N1132. The drain electrode of transistor 48 is connected to the collector of transistor 54. The emitter of transistor 54 is connected to terminal 30.

The drain electrode of transistor 48 is also connected to the base electrode of a transistor 56, which may be a 2N1711, and which has its emitter connected to output terminal 20, and through a resistor 58, which may be 6800 ohms, to terminal 36. The collector of transistor 56 is connected to terminal 30. Output terminal 20 is connected through a feedback resistor 24, which may be 10,000 ohms, to the base electrode of transistor 26.

The ability of the circuit of FIG. 2 to act as a memory lies in the fact that after the peak of the wave is past, diode 16 is rapidly back-biased and the field effect transistor 48 has an input impedance of about $1\times10^{11}$ ohms which will retard bleed-off of charge from capacitor 22. Alternatively, the field effect transistor 48 could be replaced by a small electron tube. Resistor 46 is used to limit the gate current of field effect transistor 48 in the event that the negative power supply (not illustrated) connected to terminal 36 is turned on first.

The operation of the circuit of FIG. 2 is essentially the same as that described for FIG. 1 with transistor 26 providing the major portion of the gain $K_1$ and transistor 38 acting as a cathode follower coupling stage to provide isolation. Field effect transistor 48 provides the necessary high input impedance and gain $K_2$. Transistor 54 serves to provide negative feedback around transistor 48 to linearize its characteristic. Transistor 56 serves as a cathode follower stage to provide isolation and low output impedance. The gain of the circuit is again $R_2/R_1$.

A particular advantage of the circuit of FIG. 2 is that the diode 16 is turned off hard. When the input signal $e_{in}$ applied to terminal 10 decreases after reaching a peak, transistor 26 multiplies the decrease in voltage at 10 by its gain. For a small decrease of input signal of $E/K_1$, where E is the drop across diode 16 when fully back-biased, diode 16 will become rapidly back-biased. If diode 16 does not have several tenths of a volt back-bias, it is not possible for it to develop the high impedance associated with a back-biased diode. With the gain $K_1$ of transistor 26, the required back-bias is developed rapidly.

The high input impedance of field effect transistor 48 will result in keeping the peak from decaying for long periods of time. As an example, a peak value has been held for as long as 15 minutes with less than a 1 percent loss.

In the embodiments described above, particularly that of FIG. 2 which is obviously only one way of implementing the invention using specified components, equivalent components may obviously be substituted for those described, while still remaining within the scope of the invention. It should, therefore, be understood that there is no intention to limit the invention to the specified components or values and that it is intended by the appended claims to cover all variations of both components, component arrangement and values that fall within the true spirit and scope of the invention.

What is claimed as new and desired to be secured by Letters Patent of the United States is:

1. A peak holder comprising:

an input and an output terminal; a relatively high gain preamplifier; a diode; a storage capacitor; a post amplifier having a high input impedance, a low output impedance, and a gain of substantially one comprising a two stage amplifier wherein the first stage incorporates a field effect transistor having source, drain and gate electrodes and a high input impedance with a second transistor having two of its electrodes connected across said source and drain electrodes to linearize the characteristic of said field effect transistor and the second stage constitutes an emitter follower having a low output impedance; an input resistor; and a feedback resistor;

means connecting said input resistor, said preamplifier, said diode and said post amplifier in series respectively between said input and output terminals;

means connecting said capacitor from a point between said diode and said post amplifier to a point of reference potential; and means connecting said feedback resistor from said output terminal to a point between said input resistor and said preamplifier whereby after passing a peak, said diode is quickly back-biased by the high gain of said amplifier through said feedback resistor in order to hold the peak value on said capacitor, without degradation due to the reverse-biasing of said diode.

2. The peak holder of claim 1 wherein said preamplifier constitutes a two stage transistor amplifier circuit comprising a first stage having relatively high gain and a second emitter follower stage for providing isolation.

3. The peak holder of claim 2 wherein a resistor is connected in the emitter circuit of said first stage in order to provide high gain and a second diode is connected in series with the emitter of said second stage in order to set the voltage on said capacitor at zero when the voltage on said input terminal is at zero.

4. The peak holder of claim 1 wherein a variable resistor is connected in series with said source and drain electrodes of said field effect transistor across a source of potential in order to zero the voltage on said output terminal when the voltage on said gate electrode of said field effect transistor is zero.

5. A peak holder comprising:

an input and an output terminal;

a preamplifier comprising a two stage transistor amplifier circuit having a first stage including an emitter with an emitter resistor connected in the emitter circuit in order to provide relatively high gain and a second emitter follower stage for providing isolation having a first diode connected in series with said second emitter in order to set the voltage on said capacitor at zero by means of both said first diode and said emitter resistor when the voltage on said input terminal is at zero;

a second diode;

a storage capacitor;

a current limiting resistor;

a post amplifier comprising a two stage amplifier wherein the first stage incorporates a field effect transistor having source, drain and gate electrodes and a high input impedance with a second transistor having two of its electrodes connected across said source and drain electrodes to linearize the characteristics of said field effect transistor, a variable resistor connected in series with said source and drain electrodes across a source of potential in order to zero the voltage on said output terminal when the voltage on the gate electrode of said field effect transistor is zero, and a second stage comprising an emitter follower having a low output impedance;

an input resistor;

a feedback resistor;

means connecting said input resistor, said preamplifier, said second diode, said current limiting resistor, and said post amplifier in series respectively between said input and output terminals;

means connecting said capacitor from a point between said second diode and said current limiting resistor to a point of reference potential; and, means connecting said feedback resistor from said output terminal to a point between said input resistor and said preamplifier.

References Cited

UNITED STATES PATENTS

| | | | |
|---|---|---|---|
| 2,925,557 | 2/1960 | Davis | 324—103 |
| 3,217,565 | 3/1964 | Williams | 324—103 |
| 3,222,610 | 12/1965 | Evans et al. | 307—88.5 |
| 3,257,631 | 6/1966 | Evans et al. | 317—235 |
| 3,259,760 | 7/1966 | Morey et al. | 328—151 |
| 3,264,493 | 8/1966 | Price | 317—235 |

ARTHUR GAUSS, *Primary Examiner.*

J. ZAZWORSKY, *Assistant Examiner.*